United States Patent

[11] 3,607,973

[72] Inventors Donald F. Holicky
 Parma;
 Kenneth G. Hahn, Brookpark; Robert C. Gasman, Parma, all of Ohio
[21] Appl. No. 798,769
[22] Filed Feb. 12, 1969
[45] Patented Sept. 21, 1971
[73] Assignee SCM Corporation
 Cleveland, Ohio

[54] SATURATED LINEAR POLYMERS HAVING PENDANT POLYETHYLENIC UNSATURATION
14 Claims, No Drawings

[52] U.S. Cl. .................................................. 260/836,
 260/859 R, 260/875, 260/878 R, 260/883,
 260/884, 260/885, 260/886
[51] Int. Cl. ............................................. C08g 45/04,
 C08g 15/00, C08g 19/00
[50] Field of Search ........................................... 260/836,
 859, 883–886, 875, 878

[56] References Cited
UNITED STATES PATENTS

| | | | |
|---|---|---|---|
| 2,441,516 | 5/1946 | Snyder | 260/885 |
| 2,830,032 | 4/1958 | Siebel | 260/886 |
| 2,961,423 | 11/1960 | Chapin | 260/886 |
| 3,309,423 | 3/1967 | D'Alelio | 260/884 |
| 3,317,635 | 5/1967 | Osmond | 260/836 |
| 3,335,119 | 8/1967 | D'Alelio | 260/884 |
| 3,355,415 | 11/1967 | Werrall | 260/875 |
| 3,364,282 | 1/1968 | D'Alelio | 260/885 |
| 3,390,206 | 6/1968 | Thompson | 260/884 |
| 3,393,183 | 7/1968 | Hicks | 260/885 |
| 3,429,946 | 2/1969 | Verdol | 260/836 |
| 3,509,423 | 4/1970 | Burlant | 260/859 |
| 3,382,297 | 5/1968 | Thompson | 260/885 |
| 3,514,500 | 5/1970 | Osmond | 260/878 |
| 3,528,844 | 9/1970 | Burlant | 260/885 |

FOREIGN PATENTS

| | | | |
|---|---|---|---|
| 941,305 | 11/1963 | Great Britain | 260/875 |
| 1,365,607 | 5/1964 | France | 260/875 |

*Primary Examiner*—Paul Lieberman
*Attorneys*—Harold M. Baum, Merton H. Douthitt and Howard G. Bruss

ABSTRACT: A class of polymers comprising a saturated linear ester-free backbone having pendant therefrom a plurality of ethylenically polyunsaturated groups which are polymerizable with vinyl monomer for thermosetting purposes under the influence of free radical catalysis is described, along with processes for preparing these polymers. The plurality of ethylenically polyunsaturated groups are attached to the linear polymer backbone through ester, ether, amine or amide linkage.

Linear polymers falling within the scope of this invention are advantageous in that when thermoset they produce shaped bodies or objects which have controlled physical properties (e.g., mechanical strength, rigidity or flexibility) and which also have increased chemical resistance to the action of solvents, acids and alkalis of shaped bodies or objects prepared from conventional polyester polymers. Additionally, cured films or products obtained from the polymers tend to be "uninhibited," that is the inhibition to cure of surfaces of films or articles is substantially reduced.

3,607,973

SATURATED LINEAR POLYMERS HAVING PENDANT POLYETHYLENIC UNSATURATION

BACKGROUND OF THE INVENTION

Polyester polymers or resins constitute one of the most widely used class of thermoset polymers. Such resins are the polymerized reaction products of unsaturated polycarboxylic acids and polyols, and the linear polymer chains are formed through ester linkage contained in the linear backbone which has unsaturation functionality. Polyester resins are readily cured or thermoset by polymerization with a copolymerizable monomer which cross links with the linear unsaturated polyester backbone at its unsaturation sites to form rigid products. However, polyester resins when thermoset are often disadvantageous in that the ester linkages on the backbone are subject to hydrolysis and the backbone is sometimes broken, opening the polymer grid to additional chemical attack. Also, polyesters when cured exhibit inhibition of surface cure resulting in tacky surfaces which were easily marred and subject to chemical attack.

The linear backbones of the polymers of the present invention are addition polymers, are free of ester linkage and are also saturated. The unsaturation through which cross-linking of the polymers is accomplished to obtain thermoset resins and compositions is external to the backbone and is present as ethylenic polyunsaturation on each of the plurality of pendant groups which are attached to the saturated backbone.

Since the linear backbone is an addition polymer, it is possible to produce linear resins having significantly higher molecular weight than the molecular weight of conventional polyester resins. By way of example, the average molecular weight of the polymers of this invention is in the range of from about 6,000 to about 225,000 whereas the average molecular weight of high molecular weight polyester resins is about 5,000.

Thermoset products prepared from polymers falling within the scope of this invention have increased physical strength and increased chemical resistance to attack by solvents, acids, and alkalis over thermoset products prepared from conventional polyester resins.

SUMMARY OF THE INVENTION

The present invention provides a novel class of polymers comprising a linear saturated ester-free backbone having pendant therefrom a plurality of ethylenically polyunsaturated groups wherein substantially all of said groups have ethylenically polyunsaturated functionality N, N being an integer of from 2 to 6, said copolymer being copolymerizable through at least one of the ethylenically polyunsaturation sites with vinyl monomer for thermosetting purposes.

The copolymers are advantageous in that their properties can be controlled or altered as desired by regulating the frequency, length, and degree of unsaturation of the pendant unsaturated groups thereby permitting the production of thermoset products having a wide diversity of improved physical, chemical and mechanical properties.

For example, when the backbone has a relatively large plurality of pendant ethylenically polyunsaturated groups, the resultant linear polymers, when cured or cross-linked, will produce highly rigid products having relatively great mechanical strength. On the other hand, when the backbone gas a relatively smaller number or frequency of pendant polyunsaturated groups, the polymer will tend to be flexible but will exhibit a surprisingly high flexural strength. The polymers are further advantageous in tat they produce molded or shaped products which have surprisingly high tensile strength and modulus of rupture, and have the chemical resistance hereinbefore described.

The linear polymer backbone can contain residues of any of a wide variety of hereinafter defined ethylenically unsaturated monomers. However, at least one of the monomers in the backbone must contain a chemically reactive substituent to provide reaction sites for the pendancy of the plurality of ethylenically polyunsaturated groups. The kind of substituent on such monomers can be carboxylic acid anhydride, oxirane, hydroxide, carboxyl, isocyanate, amine, amide or aldehyde substituent to provide a linear backbone having prior to the attachment of the plurality of hydroxyl, anhydride, oxirane, carboxyl, isocyanate, amine, amide or aldehyde substituents. When the appropriate ethylenically unsaturated monomer is reacted with the pendant substituent groups, the plurality of ethylenically unsaturated groups are pendant from the linear saturated backbone through ester, ether, urethane, amine and amide linkage.

Monomers other than those containing the aforementioned substituents which can be employed to form the linear saturated polymer backbone are those selected from the class consisting of ethylenically unsaturated hydrocarbons, ethylenically unsaturated esters of organic and inorganic acids, ethylenically unsaturated halides and ethylenically unsaturated nitriles.

Ethylenically unsaturated hydrocarbons which can form a portion of the polymer backbone include aliphatic hydrocarbons, for example ethylene, propylene, butylene, amylene, hexylene, heptylene, octylene, etc. Also included among ethylenically unsaturated hydrocarbons, particularly vinyl and vinylidene hydrocarbons including styrene, $\alpha$-methyl styrene, vinyl toluene, etc., and their halo-substituted counterparts.

Ethylenically unsaturated esters of organic and inorganic acids which can form a part of the polymer backbone include esters of unsaturated carboxylic acids, for example, the alkyl acrylates such as ethyl acrylate, butyl acrylate, proply acrylate, pentyl acrylate, ethyl hexyl acrylate and corresponding esters of methacrylic and crotonic acids. Also included are esters of ethylenically unsaturated alcohols of organic and inorganic acids, for example, vinyl acetate, vinyl buturate, etc.

Ethylenically unsaturated organic halides which can form a portion of the linear polymer backbone include vinyl chloride, vinyl bromide, and halo-substituted aromatic hydrocarbons such as, for example, chlorostyrene, chloromethyl styrene, etc.

Ethylenically unsaturated nitriles which can form a portion of the backbone of the polymers of this invention include, for example, acrylonitrile, crotonitrile, and the like.

The linear backbone of polymers falling within the class of this invention contains at least one and sometimes can contain several or more of the monomers falling within the above-mentioned classes in addition to the substituent-containing monomers hereinbefore described.

Where the backbone prior to the attachment of the plurality of ethylenically polyunsaturated groups contains a plurality of hydroxyl groups, the functional monomers will be selected from the class consisting of ethylenically unsaturated alcohols and hydroxyl lower alkyl esters of an ethylenically unsaturated carboxylic acid including hydroxy alkyl esters of ethylenically unsaturated mono- and dicarboxylic acids.

Examples of ethylenically unsaturated alcohols include allyl, crotyl, $\alpha$-methyl allyl, $\beta$-methyl crotyl alcohols and the like.

Examples of hydroxyalkyl esters of ethylenically unsaturated carboxylic acids are advantageously those containing from about two to about five carbon atoms in the alkyl group. Although the alkyl group can contain more than five carbon atoms, there is usually no advantage in the use of such esters and there can be certain economic disadvantages.

Examples of esters of ethylenically unsaturated monocarboxylic acids include hydroxyalkyl esters of acrylic, crotonic, isocrotonic, vinyl acetic, methacrylic, tiglic, angelic, senecioic, teracrylic, hypogeic, oleic, elaidic, erucic, brassidic, and behenic. Of these, hydroxyethyl, hydroxypropyl, and hydroxybutyl esters of acrylic, vinyl acetic and methacrylic acids are preferred for economic reasons.

Examples of hydroxyalkyl esters of unsaturated dicarboxylic acids include the diesters of fumaric, maleic, glutaconic, itaconic, ethidene malonic, mesaconic, allyl malonic, propylidene malonic, hydromuconic, pyrocinconic, allyl succinic, carbocaprolactonic, and teraconic acids. Of these, hydroxyethyl, hydroxypropyl, and hydroxybutyl diesters of fumaric, maleic, glutaconic, and itaconic acids are preferred for economic reasons.

Hydroxy lower alkyl esters which have been found to provide particularly advantageous polymer backbones are hydroxyethyl acrylate, hydroxypropyl acrylate, hydroxyethyl methacrylate, hydroxypropyl methacrylate, di(hydroxyethyl) fumarate, di(hydroxypropyl) fumarate, di(hydroxyethyl) maleate, and di(hydroxypropyl) maleate.

Linear copolymer backbones containing a plurality of pendant hydroxyl groups are intermediate saturated polymers which can be used to form polymers having a plurality of ethylenically polyunsaturated groups pendant through ester, amine, amide and ether linkage by reacting the hydroxyl groups of the linear backbone with an ethylenically unsaturated carboxylic anhydride, an ethylenically unsaturated amine or an ethylenically unsaturated glycidyl compound.

Where the linear polymer backbone prior to the pendancy of ethylenically unsaturated groups thereto contains a plurality of oxirane groups, an ethylenically unsaturated glycidyl compound is employed in the formation of the saturated linear backbone. Examples of such glycidyl compounds include glycidyl acrylate, glycidyl methacrylate, allyl glycidyl ether, and monoglycidyl maleate.

Such polymer backbones can be employed to form polymers having a plurality of ethylenically polyunsaturated groups pendant from the backbone through ester, ether, or amine linkage by reacting the oxirane groups of the linear backbone with ethylenically unsaturated dicarboxylic acids, ethylenically unsaturated dicarboxylic anhydrides, ethylenically unsaturated alcohols, or ethylenically unsaturated amines, respectively.

Where the linear polymer backbone prior to the pendancy of ethylenically unsaturated groups thereto contain a plurality of carboxyl groups, an ethylenically unsaturated carboxylic acid is employed in the formation of the saturated linear polymer backbone. Examples of such unsaturated carboxylic acids include acrylic, crotonic, isocrotonic, vinyl acetic, methacrylic, tiglic, angelic, fumaric, maleic, glutaconic, itaconic acids and the like. Such linear polymer backbones can be employed to form polymers having a plurality of ethylenically polyunsaturated groups pendant from the backbone through ester linkage.

Where the linear polymer backbone prior to the pendancy of ethylenically unsaturated groups thereto contains a plurality of amine groups, such amine groups will contain at least one hydrogen atom, and an ethylenically unsaturated primary or secondary amine is employed in the formation of the saturated linear backbone. Examples of such unsaturated amines include n-methyl amino methacrylate, n-methyl allyl amine, n-ethyl amino methacrylate, n-propyl amino ethyl hexyl acrylate, etc. The resulting polymer backbone can be employed to form polymers having a plurality of ethylenically polyunsaturated groups pendant from the backbone through amine linkage.

Where the linear polymer backbone prior to the pendancy of ethylenically unsaturated groups thereto contains a plurality of amide groups, an ethylenically unsaturated amide is employed in the formation of the backbone. Examples of such ethylenically unsaturated amides include acrylamide, methacrylamide, para-vinyl benzamide, ortho-vinyl benzamide, meta-vinyl benzamide, crotoamide, etc. Such polymer backbones can be employed to form polymers having a plurality of ethylenically polyunsaturated groups pendant from the backbone through amide linkage.

As will be evident hereinafter, the plurality of ethylenically unsaturated groups can be residues of ethylenically unsaturated monomers having conjugated ethylenic polyunsaturation. Such residues can be residues of sorbic acid (2,4-pentadienoic acid), 2,4-hexadienoic acid 2,5-hexadienoic acid, 3,5-hexadienoic acid, 2-methyl-2,4-pentadienoic acid, and the like. Alternatively, such ethylenically polyunsaturated monomers can be residues of polyunsaturated alcohols including, for example, 2,4pentadiene-1ol, 2,4-hexadiene-1-ol, 2,5-hexadiene-1-ol, and the like. Still another example of monomers having ethylenic polyunsaturation include 1-amino-2,4-pentadiene; 1-amino-2,4-hexadiene; 1-amino-2,5-hexadiene, etc.

Where the ethylenically polyunsaturated residues are residues of polyunsaturated carboxylic acids, the polymers will be the reaction products of linear polymer backbones containing a plurality of oxirane groups.

Where the polyunsaturated residues are residues of ethylenically polyunsaturated alcohols, the polymer will be formed from linear polymer backbones containing a plurality of amine groups or a plurality of epoxide groups. Where the backbone contains a plurality of amine groups, the residues of polyunsaturated alcohols will be pendant through amine linkage. Where the linear polymer backbone contains a plurality of oxirane groups, the residues of polyunsaturated alcohols will be pendant through ether linkage.

Where the plurality of pendant ethylenically unsaturated groups are residues of polyunsaturated amines, the linear polymer backbone prior to the pendancy of the polyunsaturated groups will contain a plurality of oxirane groups, or the linear polymer backbone will contain a plurality of hydroxyl groups and the plurality of polyunsaturated groups will be pendant through amine linkage.

The plurality of polyunsaturated groups can be residues which are the reaction products of two or more ethylenically mono-unsaturated monomers which are attached to or pendant from the linear polymer backbone through sequential linkages such as those hereinbefore described. By way of example, a linear polymer backbone containing a plurality of hydroxyl groups can be reacted with a stoichiometric quantity of an anhydride of a mono-unsaturated dicarboxylic acid such as, for example, maleic or itaconic anhydrides and such acid will form a half ester resulting in a linear polymer having a plurality of pendant ethylenically mono-unsaturated groups having terminal carboxyl functionality and attached to the linear backbone through ester linkage. The carboxyl functionality can be converted to a hydroxyalkyl ester through esterification with a lower alkylene oxide, for example, ethylene, propylene or butylene oxides, and the resultant hydroxyl group reacted with additional dicarboxylic acid anhydride form a linear polymer backbone having a plurality of pendant di-unsaturated groups with terminal carboxyl functionality. The above process can be repeated several times to provide a linear polymer having a plurality of ethylenically unsaturated groups containing up to eight unsaturated sites. Such polymers, when dispersed in copolymerizable vinyl monomer and cured either by free radical catalysis or irradiation, produce films or shaped bodies which have tack-free, mar-resistant surfaces and which have superior resistance to attach by solvents, acids, and alkalis.

By way of further example, a plurality of pendant hydroxyalkyl mono-unsaturated groups may be converted to di-unsaturated groups by reaction with an ethylenically unsaturated oxirane compound to provide a di-unsaturated compound attached to the mono-unsaturated monomer through ether linkage, and the ether will be hydroxyl substituted and can be further reacted with an ethylenically unsaturated amine such as those hereinbefore described.

As will be evident from the specific examples, a wide variety of polymers having a plurality of ethylenically polyunsaturated groups can be prepared by chemically reacting a wide variety of ethylenically unsaturated functional monomers containing hydroxyl, oxirane, carboxyl, amine and amide substituents.

The saturated linear backbone can be composed of any of a wide variety of residues of ethylenically unsaturated unsubstituted monomers in addition to the substituted monomers hereinbefore described. In accordance with one advantageous embodiment, the backbone comprises the addition polymer of from about 50 to 70 weight percent of a vinyl aromatic hydrocarbon such as, for example, styrene, α-methyl styrene, chloro methyl styrene, etc., and from about 30 to 50 weight percent of a hydroxy lower alkyl ester of an ethylenically unsaturated acid such as hydroxyethyl or hydroxypropyl acrylate, hydroxyethyl or hydroxypropyl methacrylate, dihydroxyethyl or dihydroxypropyl maleate, etc., to provide a linear saturated backbone having a plurality of hydroxyl groups pendant therefrom.

In another embodiment, an ethylenically unsaturated oxirane compound, amine, amide, ether, or carboxylic acid may be substituted for the hydroxyalkl ester described above. Such polymer backbones can be provided with pendant polyunsaturation by reacting them with various appropriate monomers hereinbefore described.

Another advantageous embodiment is a linear backbone comprising 50 to 70 weight percent of vinyl or vinylidene aromatic hydrocarbon, from about 20 to about 10 weight percent of an unsaturated nitrile and from about 30 to about 20 weight percent of either a hydroxy lower alkyl ester of an ethylenically unsaturated carboxylic acid, an ethylenically unsaturated glycidyl compound, an ethylenically unsaturated glycidyl compound, an ethylenically unsaturated carboxylic acid, an ethylenically unsaturated amine, an ethylenically unsaturated amide, or an ethylenically unsaturated ether.

The present invention also provides thermosettable resins comprising a linear copolymer consisting of a linear saturated ester-free backbone having pendant therefrom through linkage F, where F is selected from the group consisting of ester, ether, amine, or amide, a plurality of ethylenically polyunsaturated groups polymerizable with vinyl monomer for thermosetting purposes and a copolymerizable ethylenically unsaturated monomer. The copolymerizable ethylenically unsaturated monomer can be any vinyl monomer but is preferably an unsaturated monomer containing residues of a saturated compound having functionality $F'$, where $F'$ is selected from the group consisting of a saturated ester, ether, amine, and amide and wherein in said composition F and $F'$ are identical.

By way of example, when the linear polymeric backbone prior to the pendancy of the plurality of ethylenically polyunsaturated groups thereto contains hydroxyl functionality, the diluent in which the linear polymer is prepared by free radical addition polymerization will be a saturated hydroxyl-substituted compound preferably an unsaturated alcohol, amylene alcohol, hexyl alcohol, and the like, and at the time of pendancy of the plurality of ethylenic polyunsaturated groups to the backbone, the liquid copolymerizable monomer will be formed simultaneously by virtue of the reaction of the ethylenically polyunsaturated groups with the hydroxyl groups of the backbone and the hydroxyl groups of the liquid diluent. When the backbone prior to the addition of the plurality of ethylenically polyunsaturated groups contains a plurality of oxirane groups, such backbone will be prepared in a diluent comprising a saturated-oxirane-containing compound such as, for example, glycidol. Where, for example, the backbone prior to the pendancy of ethylenically unsaturated groups contains a plurality of carboxyl groups, the backbone polymer will be prepared in a liquid-saturated carboxylic acid diluent, for example, a lower aliphatic monocarboxylic acid and the copolymerizable monomer will be formed simultaneously with the pendancy of the plurality of ethylenically unsaturated groups by virtue of the reaction with the monomer (usually an ethylenically unsaturated oxirane) with the carboxyl groups of both the polymer backbone and the liquid carboxylic acid diluent.

In all of the foregoing instances, the copolymerizable liquid organic diluent will be an ethylenically unsaturated ester. Where the saturated linear polymer backbone prior to the pendancy of the plurality of ethylenically polyunsaturated groups thereto is a plurality of amine groups, the liquid diluent in which the polymer is prepared will be a saturated amine and the liquid copolymerizable monomer will be formed simultaneously with the pendancy of the ethylenically unsaturated groups to the backbone by virtue of the reaction of the ethylenically unsaturated compound (usually an ethylenically unsaturated alcohol or glycidyl compound) with the saturated amine. Thus, the liquid organic diluent will be a copolymerizable monomer consisting of an ethylenically unsaturated secondary or tertiary amine in which at least one of the radicals attached to the nitrogen atom of the amine is ethylenically unsaturated.

Where the linear saturated polymer backbone contains prior to the pendancy of the plurality of ethylenically unsaturated groups thereto an ether substituent, the linear saturated polymer will be prepared in an ether and the liquid polymerizable monomer will be formed simultaneously with the attachment of the plurality of ethylenic polyunsaturated groups to the polymer backbone. In this instance, the liquid polymerizable monomer will be an ethylenically unsaturated ether.

Where the saturated linear polymer backbone prior to the pendancy of ethylenically unsaturated groups thereto contains a plurality of amide substituents, the polymer backbone will be prepared in a saturated liquid amide, for example, acetamide and the copolymerizable monomer will be formed simultaneously with the attachment of the plurality of polyunsaturated groups to the polymer backbone, and the ethylenically unsaturated copolymerizable monomer will be an ethylenically unsaturated amide.

The present invention also provides a process for preparing the polymers of this invention which, as stated hereinafter, consists of polymers having a linear saturated ester-free backbone having pendant therefrom a plurality of ethylenically polyunsaturated groups where substantially all of said group have ethylenically unsaturated functionality N, N being an integer of from 2 to 6, said polymer being copolymerizable on at least one of the ethylenically unsaturated sites with vinyl monomer for thermosetting purposes. The process comprises the steps of:

1. forming a reaction mixture consisting of from about 15 to about 60 weight percent, basis the weight of the composition, of a liquid organic diluent selected from the class consisting of saturated alcohols, oxiranes, ethers, carboxylic acids, carboxylic acid anhydrides, isocyanates, amines, and amides;

2. from about 40 to about 90 weight percent, basis the weight of the polymer backbone of at least one monomer selected from the group consisting of
   a. $\alpha,\beta$-ethylenically mono unsaturated substituted and unsubstituted hydrocarbons,
   b. $\alpha,\beta$-ethylenically mono unsaturated esters of organic and inorganic acids,
   c. $\alpha$halides of $\alpha,\beta$-ethylenically mono unsaturated alcohols,
   d. $\alpha,\beta$-ethylenically mono unsaturated nitriles;

3. from about 60 to about 10 weight percent, basis the weight of the polymer backbone of a monomer selected from the group consisting of
   a. an $\alpha,\beta$-mono ethylenically unsaturated hydroxyl-substituted compound,
   b. an $\alpha,\beta$-mono ethylenically unsaturated oxirane,
   c. an $\alpha,\beta$-mono ethylenically unsaturated ether,
   d. an $\alpha,\beta$-mono ethylenically unsaturated mono-isocyanate,
   e. an $\alpha,\beta$-mono ethylenically unsaturated primary or secondary amine,
   f. an $\alpha,\beta$-mono ethylenically unsaturated amide,
   g. an $\alpha,\beta$-mono ethylenically unsaturated carboxylic acid,
   wherein the ethylenically unsaturated monomer has identical chemical functionality with the functional groups of the liquid organic diluent;

4. a free radical catalyst;
   a. heating said mixture, with agitation, in an inert atmosphere for a time sufficient to form a linear saturated ester-free addition polymer containing polar monofunctionality pendant from said backbone, said monofunctionality being selected from the class consisting of hydroxyl, carboxyl, ether, oxirane, isocyanate, amine, and amide functionality, said saturated organic diluent having identical substituent monofunctionality to the external functionality pendant from said backbone;

b. adding to the dispersion so formed an amount, sufficient to react with substantially all of the substituent functionality pendant from the backbone and with the identical functional substituents of the saturated organic diluent,
   i. when said backbone contains hydroxyl functionality, a difunctional monomer selected from the class of α,β-mono ethylenically unsaturated dicarboxylic acid anhydrides and α,β-ethylenically unsaturated oxirane compound and a polyethylenically unsaturated monocarboxylic acid,
   ii. when said backbone contains oxirane functionality, a monomer selected from the group consisting of α,βethylenically unsaturated dicarboxylic acids or anhydrides thereof, an α,β-ethylenically unsaturated dihydroxy compound,
   iii. when said backbone contains ethereal functionality, an α,β-mono ethylenically unsaturated monomer selected from the group consisting of hydroxyl-substituted monoisocyanate and a dihydroxy-substituted ethylenically unsaturated monomer
   iv. when said backbone contains amine functionality, an α,β-mono ethylenically unsaturated monomer selected from the class of hydroxyl-substituted monoisocyanates, oxiranes, and dihydroxyl-substituted compounds
   v. when said backbone contains amide functionality, an α,β-mono ethylenically unsaturated oxirane
   vi. when said backbone contains isocyanate functionality, a dihydroxy-substituted α,β-mono ethylenically unsaturated compound thereby forming a mixture comprising said saturated organic diluent and an unsaturated difunctional monomer;

c. heating the resultant mixture at a temperature and for a time sufficient to form a linear copolymer having a substantially inert backbone and having pendant therefrom a plurality of monoethylenically unsaturated groups containing reactive monofunctional groups selected from the class consisting of hydroxyl, carboxyl, ether, isocyanate, amine and amide functionality, the linear polymer being dispersed in a copolymerizable α,β-mono ethylenically unsaturated liquid monomer having the same functional linkage as that of the linkage of the plurality of ethylenically unsaturated groups pendant from the linear polymer backbone, said pendant unsaturated groups having unreacted chemical functionality selected from the group consisting of ester, ether, isocyanate, carboxyl, amine, and amide, thereby forming a mixture comprising said polymer and said unsaturated liquid organic diluent;

d. adding to said last-mentioned mixture an amount sufficient to react with the functional groups of said plurality of pendant ethylenically unsaturated groups and with the functional groups of said copolymerizable monomer an α,β-ethylenically unsaturated monomer reactible with the functional groups of said backbone and said copolymerizable monomer and selected from the class consisting of chemically mono and difunctional ester, ether, isocyanate, carboxyl, amine, and amide monomers, thereby forming a composition consisting essentially of said polymer, said unsaturated liquid organic diluent, and said last-mentioned monomers.

e. heating the resultant mixture at a temperature and for a time sufficient to form a copolymer consisting of a saturated linear ester-free backbone having pendant therefrom a plurality of di-ethylenically unsaturated groups, thereby forming a composition comprising said last-mentioned copolymer dispersed in a copolymerizable di-unsaturated monomer;

f. adding to said composition containing said plurality of ethylenically di-unsaturated groups and containing said chemical functionality an additional α,β-ethylenically unsaturated monomer of the class described in 3(d) herein, thereby forming a mixture of said copolymer and said copolymerizable monomer and said α,β-ethylenically mono unsaturated monomer, g. heating the resultant mixture at a temperature and for a time sufficient to form a copolymer consisting of a saturated linear ester-free backbone having pendant therefrom a plurality of ethylenically polyunsaturated groups suspended in a copolymerizable monomer-containing polyunsaturation.

The following specific examples are intended to illustrate the invention but not to limit the scope thereof, parts and percentages being by weight unless otherwise specified.

EXAMPLE 1

Four hundred fifty grams of 2-ethoxy ethanol were added to the reaction vessel described in example 2.

The following ingredients in the amounts listed below were added and mixed under a blanket of nitrogen in a separate container.

| Ingredients | Grams |
| --- | --- |
| Hydroxypropyl methacrylate | 100 |
| Ethyl acrylate | 400 |
| Styrene | 500 |
| Benzoyl peroxide | 15 |
| Tertiary butyl perbenzoate | 15 |

The 2-ethoxy ethanol in the reactor was heated to reflux and the above mixture was charged to the reactor over a 3-hour period while the contents were maintained under continuous agitation and at a temperature of 125°±3° C. Prior to and during the addition of the mixture, gaseous nitrogen was continuously sparged through the reactor and its contents. After the addition of the mixture was completed, the reactor contents were maintained under conditions of reflux continuous agitation and nitrogen sparge for an additional hour, after which, while heating and agitation were continued, one gram of additional tertiary butyl peroxide was charged to the reactor and contents were maintained under the same conditions for an additional 4-hour period until all of the hydroxypropyl methacrylate, ethyl acrylate, and styrene had polymerized to form a linear ester-free backbone containing a plurality of pendant hydroxyl groups. The polymer has an average molecular weight of about 20,000.

Thereafter, while agitation and nitrogen sparge were continued, the temperature of the reactor contents was held at 100° C. and 558 grams of maleic anhydride were added over a 30-minute period. During the addition, the temperature of the contents of the reactor contents increased to 130°±3° C., and heating and agitation were continued for an additional 30 minutes after completion of the addition of the maleic anhydride. There was then added 2.4 grams of lithium carbonate and 364 grams of propylene oxide, the latter being added over a 1-hour period.

The contents of the reactor were maintained for an additional hour under the same temperature, agitation and nitrogen sparge conditions and an additional 558 grams of maleic anhydride were added over a 60-minute period, and an additional 364 grams of propylene oxide was added over a 60-minute period, the contents of the reactor being held for an additional 60 minutes after the addition of the propylene oxide. Thereafter, another additional 558 grams of maleic anhydride were charged to the reactor over a 30-minute period and the contents in the reactor were held under the above-described reaction conditions for an additional 30 minutes after which another additional 364 grams of propylene oxide were added over a 1-hour period and the contents of the reactor were maintained under the same reaction conditions for an additional 60 minutes.

The resultant reaction mixture consisted essentially of a polymer comprising a linear saturated ester-free backbone having pendant therefrom through ester linkage a linear residue consisting of three successive hydroxypropyl maleate esters. In other words, the plurality of pendant unsaturated groups had polyunsaturation by virtue of the successive addition of 3 mols of maleic unsaturation through esterification effected by propylene oxide addition. The polymer was dispersed in the cellusolve triester, the ester also containing polyunsaturation by virtue of the successive formation of 3 mols of hydroxypropyl maleate.

The resultant product was converted from maleate unsaturation to fumarate unsaturation by the addition of 42 grams of piperidene and 0.086 grams of hydroquinone and heating the resultant mixture to 135°±3° C. for 4 hours to isomerize the maleate moieties to fumarate.

A portion of the liquid thermosettable polymer composition was set aside for evaluation as described in example 8.

EXAMPLE 2

To a 1-gallon pressure autoclave equipped with a thermometer, a gas inlet valve, heating and cooling coils, mechanical agitator, and inlet funnels for introducing inert gas and reactants, there is added 400 grams of ethylene glycol mono-ethyl ether. To a separate container, there was mixed under a blanket of nitrogen 220 grams of styrene, 60 grams of acrylonitrile, 120 grams of dihydroxypropyl maleate, and 4 grams of benzoyl peroxide. The mixture was charged into reactor over a period of 2 hours under continuous agitation while the contents of the reactor were maintained at 185° F. The contents of the reactor were held under nitrogen sparge, continuously agitated, and maintained at 185° F. for 10 hours until polymerization was completed. A portion of the sample was withdrawn and the average molecular weight, determined by gel phase chromatography, was found to be 85,000. The thermoplastic polymer was a linear saturated ester-free terpolymer having pendant hydroxyl groups. The temperature of the contents of the reaction vessel was increased to 225° F., and thereafter while nitrogen sparge and agitation was continued, 518.4 grams of glycidyl methacrylate and a small amount of lithium carbonate were added over a period of about 60 seconds. The resulting product was a linear polymer consisting of a saturated ester-free backbone having pendant therefrom through ether linkage, by virtue of the reaction of the glycidyl substituents with the hydroxyl groups, a plurality of hydroxyl-substituted methacrylate ether groups dispersed in ethylene glycol mono-ethyl ether methacrylate. The resulting polymer solution was then reduced in 696 grams of styrene and the resulting product consisted of a linear thermoplastic polymer having engrafted thereon through ether linkage a plurality of hydroxyl-substituted propyl methacrylate groups. The average molecular weight, determined by gel phase chromatography, was found to be 100,000. To this solution, 0.01 gram of quinone was added to prevent premature cross-linking. Thereafter, there was added 340 grams of 1-methyl benzene, 2-isocyanate-4-carbonic ester propyl methacrylate. The last-mentioned compound is the hydroxypropyl methacrylate mono-adduct of toluene diisocyanate. The reactants were added to the reaction vessel over a 4-hour period while the nitrogen gas sparge and agitation was continuously maintained. The resulting mixture was held at 250° F. for an additional 6 hours after all of the components had been added to the reaction vessel. The product obtained consisted substantially of a linear polymer having the above-mentioned backbone and a plurality of ethylenically di-unsaturated groups pendant from the backbone, each through proximal ether linkage from the glycidyl methacrylate residue and through urethane linkage. The result of the reaction of the hydroxyl substituent formed by the reaction of the glycidyl methacrylate with the pendant hydroxyl groups. The polymer had an average molecular weight of approximately 120,000. A sample of the above material was reserved for evaluation as described in example 8.

EXAMPLE 3

To a 1-gallon pressure autoclave equipped with a thermometer, a gas inlet valve, heating and cooling coils, mechanical agitator, and inlet funnels for introducing inert gas and reactants, there is added 1,000 grams of n-butyl amine. Into a separate container, there is mixed 800 grams of styrene, 100 grams of methacrylonitrile, 100 grams of methallyl amine, and 10 grams of lauroyl peroxide. This mixture is charged into the reactor over a period of 4 hours under continuous agitation and nitrogen sparge while the contents of the reactor are maintained at 150° F. Thereafter, the contents of the reaction vessel are held at this temperature for an additional 12 hours until the polymerization reaction is completed. A portion of this sample is withdrawn and the average molecular weight, determined by gel phase chromatographic techniques, is found to be 55,000. The polymer is a saturated ester-free terpolymer having pendant amine groups.

The temperature of the contents of the reaction vessel is decreased to 78° F. and thereafter, while nitrogen sparge and agitation are continued, 2,818 grams of glycidyl methacrylate containing 0.015 weight percent of hydroquinone are added to the reactor over a period of about 3 hours while the contents of the reaction vessel are maintained at 78° ±2° F. The resultant product is a thermosettable liquid consisting of a linear polymer which is unsaturated by virtue of a plurality of ethylenically unsaturated groups which are pendant from the backbone through amine linkage and a copolymerizable monomer (e.g., n-butyl dimethallyl amine). The plurality of ethylenically unsaturated groups contain hydroxyl substituents. To this reaction product, there is added a stoichiometric amount of maleic anhydride at a temperature of about 280° F. while agitation and nitrogen sparge are held constant. A small amount of lithium carbonate was added prior to the addition of the maleic anhydride. The resulting product was a linear polymer consisting of a saturated ester-free backbone having pendant therefrom through amine linkage an ethylenically unsaturated group and having pendant from this group a plurality of maleic acid residues comprising the half ester of maleic acid. Thereafter, 308.4 grams of propylene oxide were added while the contents of the reaction vessel were maintained at 250° C. using a reflux condenser to prevent oxide loss. The resulting product was a linear polymer consisting of a saturated ester-free backbone having pendant therefrom through amine linkage a plurality of ethylenically di-unsaturated groups in which the di-unsaturation comprises a residue of glycidyl methacrylate and maleic acid.

EXAMPLE 4

One thousand grams of formamide are added to the reaction vessel described in example 2. Into a separated container, there is added and mixed under a blanket of nitrogen 800 grams of styrene, 100 grams of methacrylonitrile, 100 grams of acrylamide, and 10 grams of benzoyl peroxide. The mixture is then charged into the reactor over a period of 4 hours under continuous agitation and nitrogen sparge while the contents of the reactor are maintained at 280° F. The temperature, agitation, and nitrogen sparge are maintained in the reactor for an additional 12 hours until polymerization is completed. Thereafter, a portion of the nitrogen sample is withdrawn and the average molecular weight, determined by gel phase chromatography, is found to be 29,000. The polymer is a substantially linear saturated ester-free terpolymer having pendant amide groups and is dispersed in the formamide. The temperature of the reaction vessel is then decreased to 240° F. and while nitrogen sparge and agitation are continued, 1,650 grams of glycidyl methacrylate and 10 grams of lithium carbonate are added over a period of 90 minutes. The reactor is held under these conditions until the glycidyl methacrylate has reacted with the amide groups of the saturated linear polymer backbone and the amide groups of the formamide diluent to form a polymer composition having pendant glycidyl methacrylate residues dispersed in the ethylenically unsaturated copolymerizable monomer, the reaction product of the glycidyl methacrylate and formamide which was formed in situ simultaneously with the pendancy of the glycidyl methacrylate residues onto the polymer backbone. The glycidyl methacrylate residues of the polymer and the copolymerizable monomer diluent contain hydroxyl substituents by virtue of the reaction of the glycidyl moiety with the amide. To this reaction product, there is added over a period of 60 seconds, 518 grams of maleic anhydride after the temperature was increased to 225° F. Then 308.4 grams of propylene oxide were added while the contents of the reaction vessel were maintained at reflux using adequate cooling means to prevent oxide loss.

The resulting product is a linear polymer consisting of a saturated ester-free backbone having pendant therefrom through amide linkage a plurality of glycidyl methacrylate residues and having further pendant from the glycidyl methacrylate residues a plurality of hydroxypropyl maleate residues which are attached to the glycidyl methacrylate residues through ester linkage. The linear polymer is dispersed in a copolymerizable monomer having ethylenic di-unsaturation and is the reaction product of the methacrylate amide and the maleic anhydride which has been further esterified with propylene oxide. A portion of this product was set aside for evaluation as described in example 8.

EXAMPLE 5

The procedure of example 1 was repeated and there was added to the resultant product 489 grams of glycidyl methacrylate over a period of 60 seconds. The contents of the reactor were maintained at 250° F. for 4 hours. The resultant product is a polymer consisting of a saturated linear ester-free backbone having pendant therefrom through ester linkage a plurality of ethylenically polyunsaturated groups containing 4 unsaturation sites, the second and third unsaturation sites being linked to the pendant groups through ester linkage and the fourth unsaturation site being linked to the chain through ether linkage. A portion of this product was set aside for evaluation as described in example 8.

EXAMPLE 6

The procedure of example 4 was repeated and there was added to the resultant product 98 grams of glycidyl methacrylate. The reaction was conducted in the reactor described in example 1 and the glycidyl methacrylate was added over a period of 60 seconds. The contents of the reactor were agitated under a blanket of nitrogen and the contents maintained at 250° F. for 4 hours. The resultant product is a polymer consisting of a saturated linear ester-free backbone having pendant therefrom through amide linkage a plurality of ethylenically polyunsaturated groups containing three unsaturation sites, the second unsaturation site being linked to the glycidyl methacrylate through ester linkage and being a residue of maleic acid, the third unsaturation site being a residue of glycidyl methacrylate attached to the maleic residue through ether linkage. A portion of this product was set aside for evaluation as described in example 8.

EXAMPLE 7

The procedure of example 3 was repeated and there was added to the resultant product over a period of 60 seconds, 90 grams of glycidyl methacrylate. The contents of the reactor were maintained under continuous agitation and nitrogen sparge and at a temperature of 225° F. for 6 hours. The resultant product comprises a polymer consisting of a saturated ester-free backbone having pendant therefrom through amine linkage a plurality of ethylenically polyunsaturated groups containing three unsaturation sites, the second unsaturation site being linked to the glycidyl methacrylate residue through ester linkage and the second unsaturation site being provided by a residue of the hydroxypropyl ester of maleic acid, and the third unsaturation site being linked to the aforementioned residue and comprising a residue of glycidyl methacrylate. The material is suspended in an ethylenically tri-unsaturated diluent, the reaction product of glycidyl methacrylate, hydroxypropyl maleate, and glycidyl methacrylate. A portion of the product was set aside for evaluation as described in example 8.

EXAMPLE 8

The thermosettable resin compositions of examples 1 through 7 were cast into films having a thickness of 3 mils. Prior to the cast, 0.5 percent of lauroyl peroxide was added to each of the films. The films were immersed in 3.0 N nitric acid, 1.0 N sodium hydroxide, methyl ethyl ketone and benzene for 24 hours. In every instance, loss of weight of the cured films was significantly less than cured commercial polyester films which has been accorded the same treatment. The film prepared from thermosettable compositions of example 1 was applied to a metal plate at a thickness of 0.5 mils and subjected to 2 megarads of 500 Kev. of radiation in an atmosphere of nitrogen. The resulting cured film was a tack-free, mar resistant coating.

EXAMPLE 9

To the reactor of example 2 using the conditions of example 2, there was added 400 grams of xylene. Into a separate container, there was mixed under a blanket of nitrogen, 208 grams (2 mols) of styrene, 67 grams (1 mol) of methacrylonitrile, and 71 grams (0.5 mol) of glycidyl methacrylate. The resultant mixture was charged to the reaction vessel which was held at 185° F. under a continuous nitrogen sparge and was also continuously agitated for 10 hours until polymerization was completed. The resultant polymer was a linear saturated ester-free terpolymer having pendant oxirane groups. The temperature of the reaction vessel was increased to 225° F. and there was added 57 grams of sorbic acid suspended in 100 ml. of xylene over a period of 1 hour while the temperature of the contents of the reaction vessel was maintained at 250° F. After 4 hours polymerization was completed and the resulting product was a linear polymer consisting of a saturated ester-free backbone having pendant therefrom through ester linkage a plurality of ethylenically di-unsaturated sorbic acid residues. The solvent was stripped from the polymer and replaced with styrene containing 0.1 percent hydroquinone. When cast into films and tested as described in example 8, substantially the same chemical resistance was obtained.

The thermosettable resin compositions of this invention are conventionally cured under conditions of free radical catalysis. They are useful in making fiber glass reinforced plastic products, and such products usually require less fiber glass. The compositions can be employed to form low-density foamed plastic products and such products can be conventionally obtained by curing the compositions in the presence of a blowing agent.

This application contains subject matter related to that contained in five copending U.S. Pat. applications Ser. Nos. 798,439, 798,458, 798,461, 798,469, and 798,470, filed simultaneously with the instant application and assigned to the same assignee.

What is claimed is:

1. A copolymer comprising a linear saturated ester-free backbone having pendant therefrom a plurality of ethylenically polyunsaturated groups where substantially all of said groups have ethylenically unsaturated functionality N, N being an integer of from 2 to 6, said copolymer being copolymerizable through at least one of the ethylenically unsaturation sites are polymerizable with vinyl monomer for thermosetting purposes; wherein the backbone is the addition polymer of A. from about 40 to about 90 weight percent of at least one monomer selected from the group consisting of
1. mono ethylenically unsaturated substituted and unsubstituted hydrocarbons,
2. mono ethylenically unsaturated esters of organic and inorganic acids,
3. halides of mono ethylenically unsaturated organic alcohols, and
4. mono ethylenically unsaturated nitriles, and B. from about 10 to about 20 weight percent of an α, β-mono ethylenically unsaturated mono functional monomer selected from the class consisting of oxiranes, ethers, hydroxyl compounds, amides, and primary and secondary amines;

and where said ethylenically unsaturated groups are pendant from said backbone by virtue of the reaction of substantially stoichiometric amount of an α, β-mono ethylenically unsaturated di-functional monomer reactable with the functional groups pendant from the backbone.

2. The copolymer of claim 1 wherein the plurality of pendant ethylenically unsaturated groups are attached to the backbone through linkage selected from the group consisting of ester, ether, amine and amide.

3. The polymer of claim 2 wherein the plurality of ethylenically unsaturated groups are residues of ethylenically unsaturated monomers having conjugated ethylenic polyunsaturation.

4. The polymer of claim 1 wherein the plurality of ethylenically unsaturated groups are composed of unsaturated residues of at least two monomers having mono-ethylenic unsaturation.

5. The polymer of claim 4 wherein the plurality of ethylenically unsaturated groups are attached to the backbone through ester linkage.

6. The polymer of claim 4 wherein the plurality of ethylenically unsaturated groups are attached to the polymer backbone through ether linkage.

7. The polymer of claim 4 wherein the plurality of ethylenically unsaturated groups are attached to the backbone through amine linkage.

8. The polymer of claim 4 wherein the plurality of ethylenically unsaturated groups are attached to the backbone through amide linkage.

9. The polymer of claim 5 wherein the plurality of ethylenically unsaturated groups are composed of residues of at least two ethylenically unsaturated esters.

10. The polymer of claim 6 wherein the plurality of ethylenically unsaturated groups are composed of residues of at least two ethylenically unsaturated ethers.

11. The polymer of claim 7 wherein the ethylenically unsaturated groups are composed of residues of an ethylenically unsaturated amine and at least one ethylenically unsaturated epoxide.

12. The copolymer of claim 8 wherein the plurality of ethylenically unsaturated groups are composed of residues of an ethylenically unsaturated amide and at least one ethylenically unsaturated epoxide.

13. The copolymer of claim 1 dispersed in a liquid ethylenically unsaturated compound.

14. A process for preparing a copolymer comprising a linear saturated ester-free backbone having pendant therefrom a plurality of ethylenically polyunsaturated groups wherein substantially all of said groups have ethylenically unsaturated functionality N, N being an integer of from 2 to 6, said polymer being copolymerizable through at least one of the ethylenically unsaturated sites with vinyl monomer for thermosetting purposes which comprises the steps of 1. forming a reaction mixture consisting essentially of from about 15 to about 60 weight percent, basis the weight of the composition, of a liquid organic diluent selected from the class consisting of saturated alcohols oxiranes, ethers, carboxylic acids, carboxylic acid anhydrides isocyanates, amines, and amides;

2. from about 40 to about 90 weight percent, basic the weight of the polymer backbone, of at least one monomer selected from the group consisting of
   a. α,β-ethylenically mono unsaturated substituted and unsubstituted hydrocarbons
   b. ethylenically mono unsaturated esters of organic and inorganic acids
   c. halides of α, β-ethylenically mono unsaturated alcohols;
   d. α,β-ethylenically mono unsaturated nitriles 3. from about 60 to about 10 weight percent, basis the weight the polymer backbone of a monomer selected from the group consisting of
   a. an α, β-mono ethylenically unsaturated hydroxyl substituted compound
   b. an α, β-mono ethylenically unsaturated oxirane
   c. an α, β-mono ethylenically unsaturated ether
   d. an α, β-mono ethylenically unsaturated mono-isocyanate
   e. an α, β-mono ethylenically unsaturated primary or secondary amine
   f. an α, β-mono ethylenically unsaturated amide
   g. an α, βethylenically unsaturated carboxylic acid wherein the ethylenically unsaturated monomer has identical chemical functionality with the functional groups of the liquid organic diluent;

4. a free radical catalyst;
   a. heating said mixture with agitation in an inert atmosphere for a time sufficient to form a linear saturated ester-free additional polymer containing polar mono functionality pendant from said backbone, said mono functionality being selected from the class consisting of hydroxyl, carboxyl, ether oxirane, isocyanate, amine, and amide functionality, said saturated organic diluent having identical substituent mono functionality to the external functionality pendant from said backbone
   b. adding to the dispersion so formed an amount, sufficient to react with substantially all of the substituent functionality pendant from the backbone and with the identical functional substituents of the saturated organic diluent,
      i. when said backbone contains hydroxyl functionality, a difunctional monomer selected from the class of α, β-mono ethylenically unsaturated dicarboxylic acid anhydrides and α, β-ethylenically unsaturated oxirane compounds and a poly ethylenically unsaturated mono carboxylic acid
      ii. when said backbone contains oxirane functionality, a monomer selected from the group consisting of α, β-ethylenically unsaturated dicarboxylic acids or anhydrides thereof, an α, β-ethylenically unsaturated dihydroxy compound
      iii. when said backbone contains ethereal functionality, an α, β-mono ethylenically unsaturated monomer selected from the group consisting of hydroxyl substituted monoisocyanate and a dihydroxy-substituted ethylenically unsaturated monomer
      iv. when said backbone contains amine functionality, an α, β-mono ethylenically unsaturated monomer selected from the class of hydroxyl-substituted monoisocyanates, oxiranes, and dihydroxyl-substituted compounds
      v. when said backbone contains amide functionality, an α, β-mono ethylenically unsaturated oxirane
      vi. when said backbone contains isocyanate functionality, a dihydroxy-substituted α, β-mono ethylenically unsaturated compound thereby forming a mixture comprising said saturated organic diluent and an unsaturated difunctional monomer c. heating the resultant mixture at a temperature and for a time sufficient to form a linear copolymer having a substantially inert backbone and having pendant therefrom a plurality of mono ethylenically unsaturated groups, containing reactive mono functional groups selected from the class consisting of hydroxyl, carboxyl, ether, isocyanate, amine, and amide functionality, the linear polymer being dispersed in a copolymerizable α, β-mono ethylenically unsaturated liquid monomer having the same functional linkage as that of the linkage of the plurality of ethylenically unsaturated groups pendant from the linear polymer backbone, said pendant unsaturated groups having unreacted chemical functionality selected from the group consisting of ester, ether, isocyanate, carboxyl, amine, and amide, thereby forming a mixture comprising said polymer and said unsaturated liquid organic diluent, d. adding to said last-mentioned mixture an amount sufficient to react with the functional groups of said plurality of pendant ethylenically unsaturated groups and with the functional groups of said copolymerizable monomer an α, βethylenically unsaturated monomer reactable with the functional groups of said backbone and said copolymerizable monomer and selected from the class consisting of chemically mono- and difunctional ester, ether, isocyanate, carboxyl, amine, and amide monomers, thereby forming a composition consisting essentially of said polymer, said unsaturated liquid organic diluent, and said last-mentioned monomers.

e. heating the resultant mixture at a temperature and for a time sufficient to form a copolymer consisting of a saturated linear ester-free backbone having pendant therefrom a plurality of diethylenically unsaturated groups thereby forming a composition comprising said last-mentioned copolymer dispersed in a copolymerizable di-unsaturated monomer, f. adding to said composition containing said plurality of ethylenically di-unsaturated groups and containing said chemical functionality an additional α, β-ethylenically unsaturated monomer of the class described in 3(d) herein, thereby forming a mixture of said copolymer and said copolymerizable monomer and said α, β-ethylenically mono unsaturated monomer g. heating the resultant mixture at a temperature and for a time sufficient to form a copolymer consisting of a saturated linear ester-free backbone having pendant therefrom a plurality of ethylenically polyunsaturated groups suspended in a copolymerizable monomer containing polyunsaturation.